United States Patent
Rodriguez Salinas et al.

(10) Patent No.: US 10,457,784 B2
(45) Date of Patent: Oct. 29, 2019

(54) REINFORCING MECHANICAL, THERMICAL AND ELECTRICAL PROPERTIES OF THERMOPLASTIC POLYMER WITH NANO PARTICLES

(71) Applicant: Siemens Industry, Inc., Alpharetta, GA (US)

(72) Inventors: Juan Jose Rodriguez Salinas, Monterrey (MX); Javier Garcia Martinez, Monterrey (MX); Eduardo Jimenez Gonzalez, San Pedro Garza Garcia (MX)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 262 days.

(21) Appl. No.: 15/591,714

(22) Filed: May 10, 2017

(65) Prior Publication Data
US 2018/0327555 A1    Nov. 15, 2018

(51) Int. Cl.
| | |
|---|---|
| *B29C 70/60* | (2006.01) |
| *C08K 3/34* | (2006.01) |
| *C08J 5/00* | (2006.01) |
| *C08J 3/20* | (2006.01) |
| *B29C 70/88* | (2006.01) |
| *H01H 71/02* | (2006.01) |

(52) U.S. Cl.
CPC .............. *C08J 5/005* (2013.01); *B29C 70/60* (2013.01); *B29C 70/882* (2013.01); *B29C 70/887* (2013.01); *C08J 3/203* (2013.01); *C08K 3/34* (2013.01); *H01H 71/025* (2013.01); *C08J 2377/06* (2013.01); *C08K 2201/011* (2013.01); *H01H 71/0257* (2013.01); *H01H 2300/036* (2013.01)

(58) Field of Classification Search
CPC ........ C08J 5/005; C08J 3/203; C08J 2377/06; B29C 70/60; B29C 70/882; B29C 70/887; C08K 3/34; C08K 2201/011; H01H 71/025; H01H 71/0257; H01H 2300/036
USPC ........................................................ 524/443
See application file for complete search history.

(56) References Cited

FOREIGN PATENT DOCUMENTS

CN    108997666 A    * 12/2018

* cited by examiner

*Primary Examiner* — Kelechi C Egwim

(57) ABSTRACT

A circuit breaker comprises a body made of a nanocomposite material formed by insertion of nano particles of a nano particles material in thermoplastic polymer of a thermoplastic polymer material. A method of reinforcing a material with another material, the method comprises mixing homogenously a thermoplastic polymer material with a nano particles material in a hot process to reinforce the thermoplastic polymer material with the nano particles material and forming a nanocomposite material by insertion of nano particles of the nano particles material in thermoplastic polymer of the thermoplastic polymer material. The nano particles material has a mechanical wear property, a dielectric property and a thermal property of fire retardant.

20 Claims, 3 Drawing Sheets

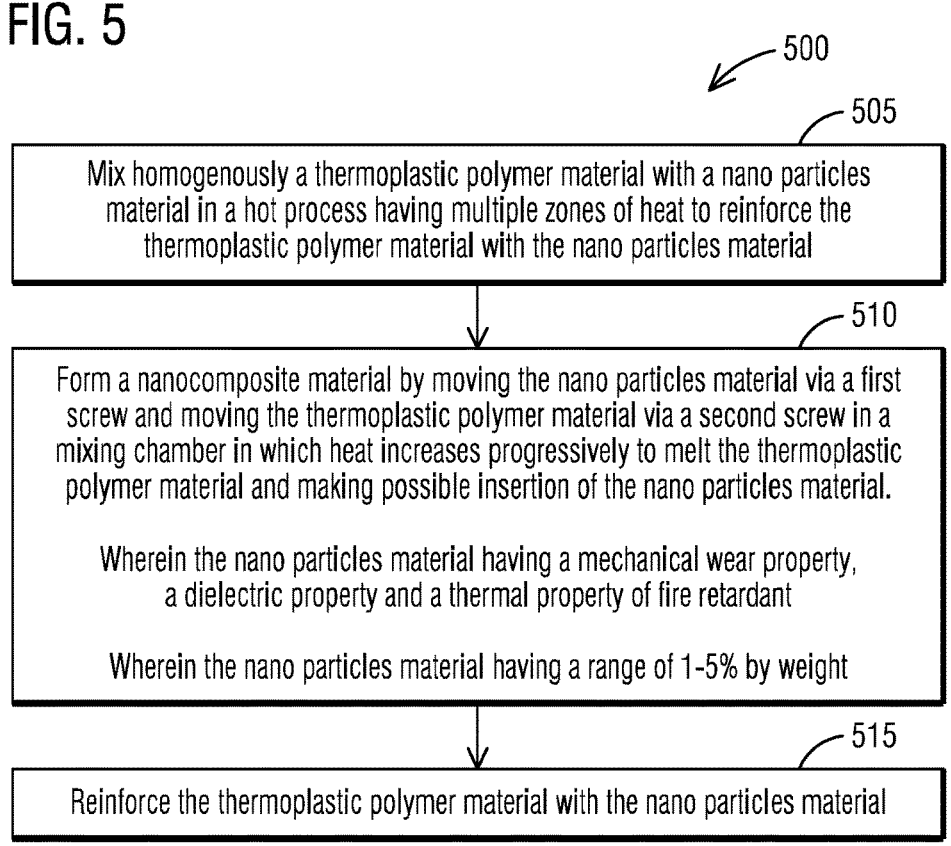
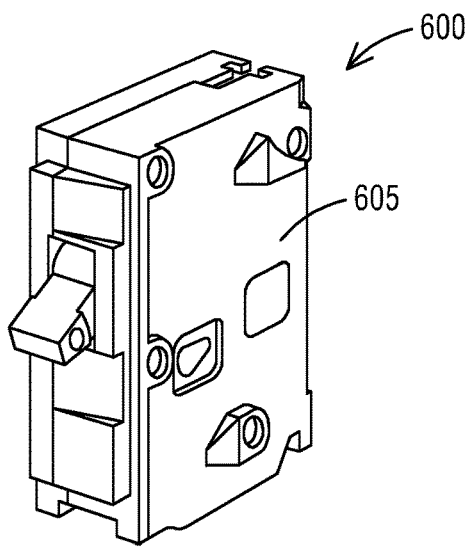

REINFORCING MECHANICAL, THERMICAL AND ELECTRICAL PROPERTIES OF THERMOPLASTIC POLYMER WITH NANO PARTICLES

BACKGROUND

1. Field

Aspects of the present invention generally relate to reinforcing mechanical, thermical and electrical properties of a thermoplastic polymer material with a nano particles material to produce a nanocomposite to be used for making a body of a circuit breaker.

2. Description of the Related Art

A thermosetting resin is a prepolymer in a soft solid or viscous liquid state that changes irreversibly into an infusible, insoluble polymer network by curing. Curing is induced by the action of heat or suitable radiation often under high pressure, or by mixing with a catalyst or cross-linking agent often under atmospheric conditions at ambient temperature. A cured thermosetting resin is called a thermoset or a thermosetting plastic/polymer—when used as the bulk material in a polymer composite, they are referred to as the thermoset polymer matrix. When compounded with fibers they form fiber reinforced polymer composites which are used in the fabrication of factory finished structural composite OEM or replacement parts. Polymer matrix composites, where polymers act as binder or matrix to secure in place incorporated particulates, fibers or other reinforcements, can be formulated with a diversity of properties for a wide variety of structural end uses. Thermoset plastic polymers characterized by rigid, three-dimensional structures and high molecular weight, stay out of shape when deformed and undergo permanent or plastic deformation under load, and normally decompose before melting. Thermoset plastics are synthetic materials that strengthen during being heated, but cannot be successfully remolded or reheated after their initial heat-forming. This is in contrast to thermoplastics, which soften when heated and harden and strengthen after cooling.

Thermoset material is typically used to produce a base and a cover of Module Case Circuit Breakers (MCCBs). Thermoset material is used because it has certain mechanical and thermical properties. Module Case Circuit Breakers (MCCBs) have a rugged construction as they can break larger currents usually from (100-1000 A). Module Case Circuit Breakers (MCCBs) protect low voltage AC and DC electrical systems and equipment.

Until now the only material capable of withstanding the pressure and heat generated by an electrical arc in the circuit interruption is thermoset. This material can withstand a lot of mechanical pressure and doesn't suffer any alteration due to high thermal conditions of operation. However, use of the thermoset technology is very old, the process to create this material is not ecological and the use of fiber to reinforce the plastic can produce health problems in the person working with this material. This material is not recyclable since the fiber will not allow to decompose the base material.

Therefore, there is a need for a manufacturing material that is friendly to workers who produce it and is also environment friendly while has similar properties like thermoset.

SUMMARY

Briefly described, aspects of the present invention relate to using a thermoplastic material reinforced using nano technology for making a circuit breaker body (a base and a cover) such that the reinforced thermoplastic material to have the same mechanical, thermical and electrical properties present in the thermoset. The reinforced thermoplastic material is capable enough to withstand the pressure and heat generated by an electrical arc in the circuit interruption in the circuit breaker. The reinforced thermoplastic material can withstand a lot of mechanical pressure and doesn't suffer any alteration due to high thermal conditions of operation.

In accordance with one illustrative embodiment of the present invention, a method of reinforcing a material with another material is provided. The method comprises mixing homogenously a thermoplastic polymer material with a nano particles material in a hot process to reinforce the thermoplastic polymer material with the nano particles material and forming a nanocomposite material by insertion of nano particles of the nano particles material in thermoplastic polymer of the thermoplastic polymer material. The nano particles material has a mechanical wear property, a dielectric property and a thermal property of fire retardant.

In accordance with another illustrative embodiment of the present invention, a circuit breaker is provided. The circuit breaker comprises a body of a nanocomposite material formed by insertion of nano particles of a nano particles material in thermoplastic polymer of a thermoplastic polymer material. The thermoplastic polymer material is mixed homogenously with the nano particles material in a hot process to reinforce the thermoplastic polymer material with the nano particles material. The nano particles material has a mechanical wear property, a dielectric property and a thermal property of fire retardant.

In accordance with another illustrative embodiment of the present invention, a method of reinforcing a thermoplastic polymer material with a nano particles material is provided. The method comprises mixing homogenously a thermoplastic polymer material with a nano particles material in a hot process having multiple zones of heat to reinforce the thermoplastic polymer material with the nano particles material and forming a nanocomposite material by moving the nano particles material via a first screw and moving the thermoplastic polymer material via a second screw in a mixing chamber in which heat increases progressively to melt the thermoplastic polymer material and making possible insertion of the nano particles material. The nano particles material has a mechanical wear property, a dielectric property and a thermal property of fire retardant. The nano particles material has a range of 1-5% by weight.

BRIEF DESCRIPTION OF THE DRAWINGS

FIG. 5 illustrates a flow chart of a method of reinforcing a thermoplastic polymer material with a nano particles material according to an exemplary embodiment of the present invention.

FIG. 6 illustrates a perspective view of a circuit breaker made of a nanocomposite material in that a base material is a thermoplastic polymer material in accordance with an exemplary embodiment of the present invention.

DETAILED DESCRIPTION

To facilitate an understanding of embodiments, principles, and features of the present invention, they are explained hereinafter with reference to implementation in illustrative embodiments. In particular, they are described in the context of a manufacturing process of making a nanocomposite material. A method of reinforcing a thermoplastic polymer material with a nano particles material is disclosed. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

A nano particles material is used to reinforce the thermoplastic polymer material to produce change in the mechanical, thermical, electrical properties of a base material (thermoplastic). A correct amount of nano particles can modify the properties of the base material to ensure the same mechanical thermical and electrical characteristics of the base material as that of the nano particles material. The advantage of using this nano mixing process is that it can create the reinforced thermoplastic material (nanocomposite material) that is environmental friendly, safe to the user and since it is thermoplastic-based it could be recyclable.

Figure 1:
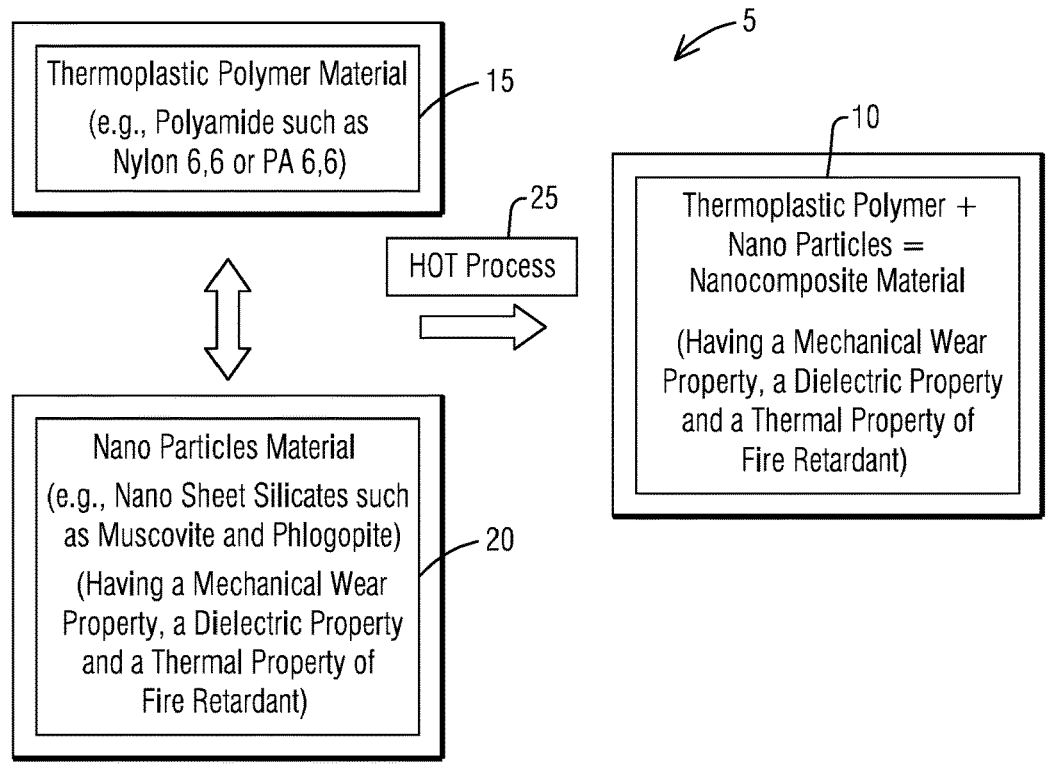
FIG. 1 illustrates a schematic block diagram of a manufacturing process of making a nanocomposite material in accordance with an exemplary embodiment of the present invention.

Consistent with one embodiment of the present invention, FIG. 1 represents a schematic block diagram of a manufacturing process 5 of making a nanocomposite material 10 in accordance with an exemplary embodiment of the present invention. To reinforce a base material with a reinforcement material, in the manufacturing process 5, a thermoplastic polymer material 15 is mixed homogenously with a nano particles material 20 in a hot process 25 to reinforce the thermoplastic polymer material 15 with the nano particles material 20. By using the hot process 25 to gradually melt two mixing materials, the nanocomposite material 10 is formed by insertion of nano particles of the nano particles material 20 in thermoplastic polymer of the thermoplastic polymer material 15. In one embodiment, mixing of the thermoplastic polymer material 15 with the nano particles material 20 in the hot process 25 is done in multiple zones of heat. For example, temperatures may be set in a sequence of 257 C°, 267 C°, 257 C°, 247 C°, 172 C.° from one end to another end of a mixing chamber.

The nanocomposite material 10 is a multiphase solid material where one of the phases has one, two or three dimensions of less than 100 nanometers (nm), or structures having nano-scale repeat distances between the different phases that make up the material. In the broadest sense this definition can include to mean the solid combination of a bulk matrix and nano-dimensional phase(s) differing in properties due to dissimilarities in structure and chemistry. The mechanical, electrical, thermal, optical, electrochemical, catalytic properties of the nanocomposite will differ markedly from that of the component materials. In mechanical terms, the nanocomposite material 10 differs from conventional composite materials due to the exceptionally high surface to volume ratio of the reinforcing phase and/or its exceptionally high aspect ratio. The reinforcing material can be made up of particles, sheets or fibres. The area of the interface between the matrix and reinforcement phase(s) is typically an order of magnitude greater than for conventional composite materials.

The nano particles material 20 has a mechanical wear property, a dielectric property and a thermal property of fire retardant. The nano particles material 20 is used to reinforce the thermoplastic polymer material 15 to produce change in the mechanical, thermical, electrical properties of a base material (thermoplastic). Examples of the nano particles material 20 include nano sheet silicates such as Muscovite $KAl_2(AlSi_3O_{10})(OH)_2$ and Phlogopite $K(Mg, Fe, Mn)_3Si_3AlO_{10}(F,OH)_2$.

Muscovite (also known as common mica, isinglass, or potash mica) is a phyllosilicate mineral of aluminum and potassium. It has a highly perfect basal cleavage yielding remarkably thin laminae (sheets) which are often highly elastic. Muscovite has a Mohs hardness of 2-2.25 parallel to the [001] face, 4 perpendicular to the [001] and a specific gravity of 2.76-3. It can be colorless or tinted through grays, browns, greens, yellows, or (rarely) violet or red, and can be transparent or translucent. It is anisotropic and has high birefringence. Its crystal system is monoclinic.

Phlogopite is a yellow, greenish, or reddish-brown member of the mica family of phyllosilicates. It is also known as magnesium mica. Phlogopite is the magnesium end member of the biotite solid solution series. Iron substitutes for magnesium in variable amounts leading to the more common biotite with higher iron content. For physical and optical identification, it shares most of the characteristic properties of biotite.

The techniques described herein can be particularly useful for using sheet silicates. While particular embodiments are described in terms of the Muscovite and Phlogopite, the techniques described herein are not limited to the sheet silicates but can also use other nano structures such as other nano clays.

A correct amount of nano particles can modify the properties of the base material to ensure the same mechanical thermical and electrical characteristics of the base material as that of the nano particles material 20. For example, the nano particles material 20 may have a range of 1-5% by weight. The nano particles material 20 may have a range one of 1% the nano particles material 20 by weight, or 3% the nano particles material 20 by weight, or 5% the nano particles material 20 by weight. Muscovite or Phlogopite may have a range of 1-5% by weight.

The thermoplastic polymer material 15 is a plastic material polymer that becomes pliable or moldable above a specific temperature and solidifies upon cooling. The thermoplastic polymer material 15 is a material that is made of polymers linked by intermolecular interactions or van der Waals forces, forming linear or branched structures. The thermoplastic polymer material 15 can be compared to a set of strings that are mixed on a table, each of these strings represents a polymer, the greater degree of mixing of the strings greater the effort will be made to separate the strings from each other, due the friction that occurs between each of the cords as they offer resistance to separate, in this example the friction represents the intermolecular forces that holds together the polymer.

Examples of the thermoplastic polymer material 15 include a polyamide such as Nylon 6, 6 (aka nylon 6-6, nylon 6/6 or nylon 6,6) or PA 6, 6. Polyamide is a synthetic polymer of a type made by the linkage of an amino group of one molecule and a carboxylic acid group of another, including many synthetic fibers such as nylon. In other words, a polyamide is a macromolecule with repeating units linked by amide bonds. Nylon 6,6 is made of two monomers each containing 6 carbon atoms, hexamethylenediamine and adipic acid, which give nylon 6, 6 or PA 6, 6.

Artificially made polyamides can be made through step-growth polymerization or solid-phase synthesis yielding materials such as nylons. Nylon belongs to a class of polymers called polyamides. Production of polymers requires the repeated joining of two groups to form an amide linkage. In this case this specifically involves amide bonds, and the two groups involved are an amine group, and a terminal carbonyl component of a functional group. Polyamides can also be synthesized from dinitriles using acid catalysis via an application of the Ritter reaction. Polyamides can be synthesized from glycols and dinitriles using this method as well.

Nylon 6, 6 is synthesized by polycondensation of hexamethylenediamine and adipic acid. Equivalent amounts of hexamethylenediamine and adipic acid are combined with water in a reactor. This is crystallized to make nylon salt, which has precisely stoichiometric equivalents. The nylon salt goes into a reaction vessel where polymerization process takes place either in batches or continuously.

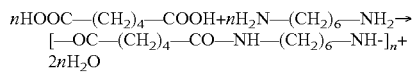

$$n\text{HOOC}-(CH_2)_4-\text{COOH}+n\text{H}_2\text{N}-(CH_2)_6-\text{NH}_2 \rightarrow [-\text{OC}-(CH_2)_4-\text{CO}-\text{NH}-(CH_2)_6-\text{NH}-]_n + 2n\text{H}_2\text{O}$$

Removing water drives the reaction toward polymerization through the formation of amide bonds from the acid and amine functions. Thus molten nylon 66 is formed. It can either be extruded and granulated at this point or directly spun into fibres by extrusion through a spinneret (a small metal plate with fine holes) and cooling to form filaments.

Figure 2:
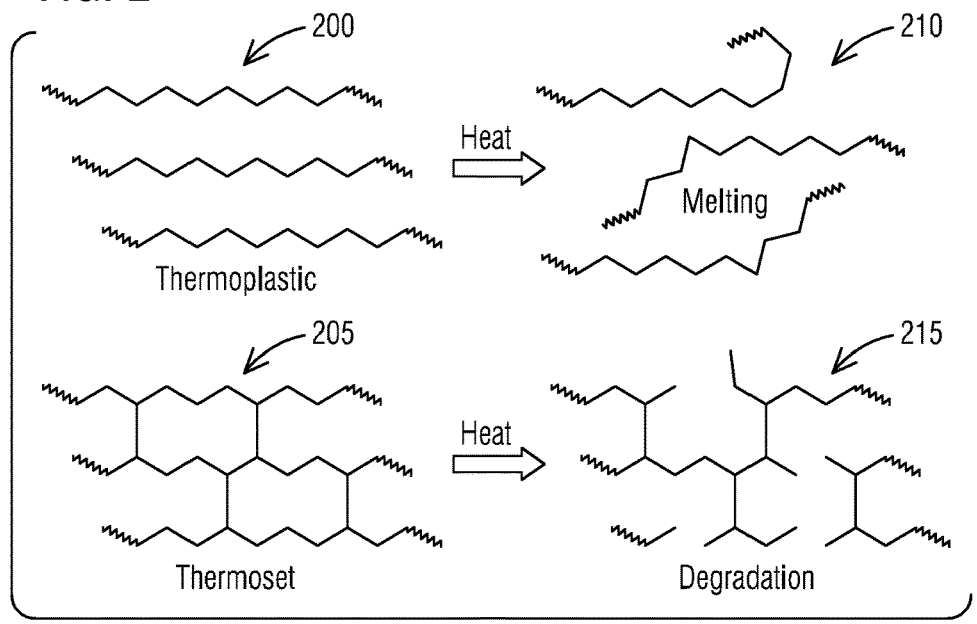
FIG. 2 illustrates a schematic diagram of a thermoplastic material and a thermoset material in accordance with an exemplary embodiment of the present invention.

Referring to FIG. 2, it illustrates a schematic diagram of a thermoplastic polymer material 200 and a thermoset material 205 in accordance with an exemplary embodiment of the present invention. Most thermoplastics have a high molecular weight. The polymer chains associate through intermolecular forces, which weaken rapidly with increased temperature, yielding a viscous liquid 210. Thus, thermoplastics may be reshaped by heating and are typically used to produce parts by various polymer processing techniques such as injection molding, compression molding, calendaring, and extrusion.

Thermoplastics differ from thermosetting polymers, which form irreversible chemical bonds during the curing process. Thermosets do not melt, but decompose and do not reform upon cooling, as shown by a decomposed material 215.

Until now the only material capable of withstanding the pressure and heat generated by an electrical arc in the circuit interruption is thermoset. This material can withstand a lot of mechanical pressure and doesn't suffer any alteration due to high thermal conditions of operation. However, use of the thermoset technology is very old, the process to create this material is not ecological and the use of fiber to reinforce the plastic can produce health problems in the person working with this material. This material is not recyclable since the fiber will not allow to decompose the base material.

In the simplest case, appropriately adding nano particles to a polymer matrix can enhance its performance, often dramatically, by simply capitalizing on the nature and properties of the nanoscale filler (these materials are better described by the term nanofilled polymer composites). Nano particles are being used as reinforcing agents to fabricate mechanically strong polymeric nanocomposites.

The advantage of using a nano mixing process is that it can create the reinforced thermoplastic material (nanocomposite material) that is environmental friendly, safe to the user and since it is thermoplastic-based it could be recyclable. A mixing of nano materials to reinforce the thermoplastic and building a circuit breaker involves an injection process to produce a base and a cover. This manufacturing process will provide parts with better tolerances, and since this process is faster will allow to produce more parts in less time, giving an economical advantage. The process used to create thermoplastics reinforced with nano materials will be safer to produce and environmental friendly. Some testing was done in that created testing probes using nylon 6,6 as a base material and some nanostructures as a reinforcement material. The test performed on these probes was an impact test to measure the hardness and also flexion tests to measure the Young's modulus of elasticity E.

Figure 3:
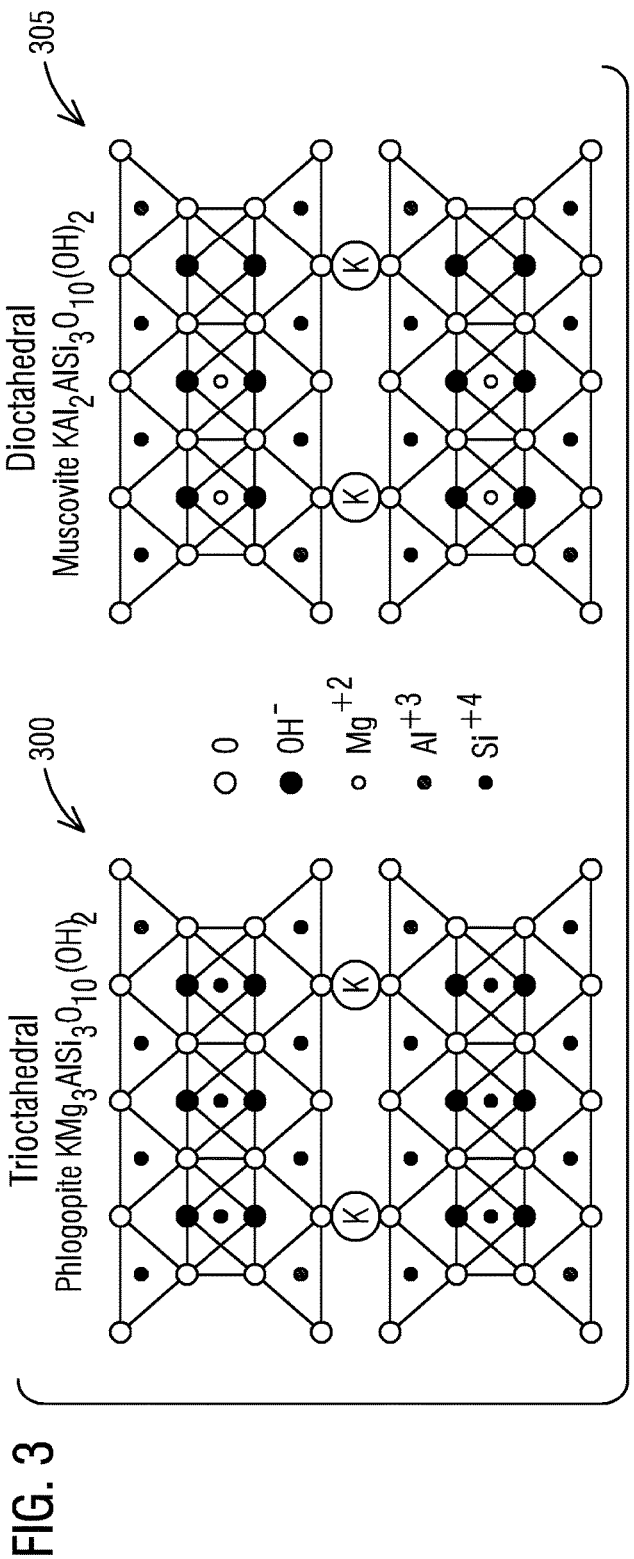
FIG. 3 illustrates a schematic diagram of phlogopite and muscovite in accordance with another exemplary embodiment of the present invention.

Turning now to FIG. 3, it illustrates a schematic diagram of phlogopite 300 and muscovite 305 in accordance with another exemplary embodiment of the present invention. The phyllosilicates, or sheet silicates, are an important group of minerals that includes the micas, chlorite, serpentine, talc, and the clay minerals.

The basic structure of the phyllosilicates is based on interconnected six member rings of $SiO_4^{-4}$ tetrahedra that extend outward in infinite sheets. Three out of the 4 oxygens from each tetrahedra are shared with other tetrahedra. This leads to a basic structural unit of $Si_2O_5^{-2}$. Most phyllosilicates contain hydroxyl ion, $OH^-$, with the OH located at the center of the 6 membered rings, as shown here. Thus, the group becomes $Si_2O_5(OH)^{-3}$. When other cations are bonded to the $SiO_4$ sheets, they share the apical oxygens and the (OH) ions which bond to the other cations in octahedral coordination. This forms a layer of cations, usually $Fe^{+2}$, $Mg^{+2}$ or $Al^{+3}$, that occur in octahedral coordination with the O and OH ions of the tetrahedral layer. As shown, here, the triangles become the faces of the octahedral groups that can bind to the tetrahedral layers.

The octahedral layers take on the structure of either Brucite $[Mg(OH)_3]$, if the cations are +2 ions like $Mg^{+2}$ or $Fe^{+2}$, or Gibbsite $[Al(OH)_3]$, if the cations are +3 like $Al^{+3}$. In the brucite structure, all octahedral sites are occupied and all anions are $OH^{-1}$. In the Gibbsite structure every $3^{rd}$ cation site is unoccupied and all anions are $OH^{-1}$.

This gives rise to 2 groups of sheet silicates:
1. The trioctahedral sheet silicates where each O or OH ion is surrounded by 3 divalent cations, like $Mg^{+2}$ or $Fe^{+2}$.
2. The dioctahedral sheet silicates where each O or OH ion is surrounded by 2 trivalent cations, usually $Al^{+3}$.

If an $Al^{+3}$ is substituted for every $4^{th}$ $Si^{+4}$ in the tetrahedral layer, this causes an excess −1 charge in each T-O-T layer. To satisfy the charge, $K^{+1}$ or $Na^{+1}$ can be bonded between 2 T-O-T sheets in 12-fold coordination.

For the trioctahedral sheet silicates this becomes Phlogopite 300 (Mg-biotite), and for the dioctahedral sheet silicates this becomes Muscovite 305. This makes a T-O-T-T-O-T layer that, again can bind to another T-O-T-T-O-T layer by weak Van der Waals bonds. It is along these layers of weak bonding that the prominent {001} cleavage in the sheet silicates occurs.

Figure 4:
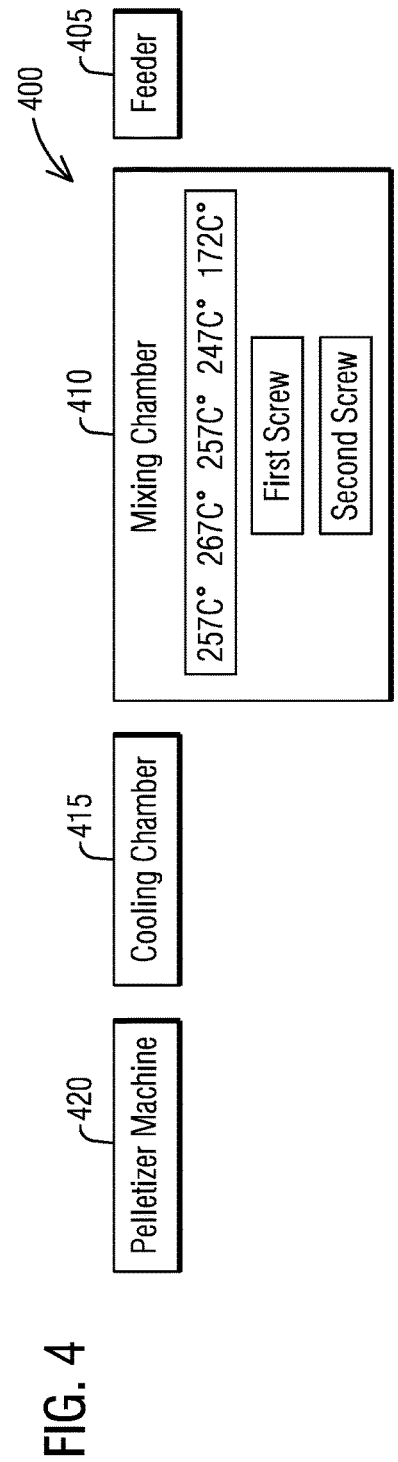
FIG. 4 illustrates a schematic block diagram of a manufacturing setup of making a nanocomposite material in accordance with an exemplary embodiment of the present invention.

FIG. 4 illustrates a schematic block diagram of a manufacturing setup 400 of making a nanocomposite material in accordance with an exemplary embodiment of the present invention. The manufacturing setup 400 includes a feeder 405, a mixing chamber 410, a cooling chamber 415 and a pelletizer machine 420. At the feeder 405 a thermoplastic polymer material and a nano particles material are inserted to be mixed in the mixing chamber 410. The mixing chamber 410 contains a first screw 425(1) and a second screw 425(2) that move together. The first screw 425(1) and the second screw 425(2) make possible mixing of the materials. The velocity of movement of the first screw 425(1) and the second screw 425(2) is regulated to 120 RPM to ensure the mixing is homogenous and can be repeated.

The mixing chamber 410 has 5 zones of heat. The heat increases progressively to ensure the plastic material melts and makes it possible the insertion of the nano particles via mixing. The 5 zone temperatures are shown in Celsius.

After the mixing, the thermoplastic polymer material leaves the mixing chamber 410 in the form of a rod and passes to the cooling chamber 415. The cooling chamber has a small water pool to cool the melted plastic and help turn into a solid. Next this plastic material moves to the pelletizer machine 420, where the rod is cut into a small portion of plastic called pellets. There pellets are later used in a process to create the plastic parts used in the circuit breaker.

Prior to feeding the nano particles material to the feeder 405, the process starts when the nano particles (Nano Clay) are mixed in a emulsion agent (alcohol), to ensure the material is properly homogenous. For example, a sonic probe is used for 2 minutes with a velocity of the movement of the probe at 16800 RPM. Then the mixture is put into a magnetic plate to evaporate the emulsion agent and leave the nano material without any traces of humidity. When the powder mixed material is ready it needs to be converted in plastic pellets for its later use. This may be achieved with the use of a plastic extruder.

As seen in FIG. 5, it illustrates a flow chart of a method 500 of reinforcing a thermoplastic polymer material with a nano particles material according to an exemplary embodiment of the present invention. Reference is made to the elements and features described in FIGS. 1-4. It should be appreciated that some steps are not required to be performed in any particular order, and that some steps are optional.

At step 505, a thermoplastic polymer material is to be mixed homogenously with a nano particles material in a hot process having multiple zones of heat to reinforce the thermoplastic polymer material with the nano particles material. At step 510, the method 500 includes forming a nanocomposite material by moving the nano particles material via a first screw and moving the thermoplastic polymer material via a second screw in a mixing chamber in which heat increases progressively to melt the thermoplastic polymer material and making possible insertion of the nano particles material. The nano particles material has a mechanical wear property, a dielectric property and a thermal property of fire retardant. The nano particles material has a range of 1-5% by weight. At step 515, the method 500 includes reinforcing the thermoplastic polymer material with the nano particles material.

As shown in FIG. 6, it illustrates a perspective view of a circuit breaker 600 made of a nanocomposite material in that a base material is a thermoplastic polymer material in accordance with an exemplary embodiment of the present invention.

A reinforced thermoplastic polymer material or a nanocomposite material is used to produce a body 605 (a base and a cover) of the circuit breaker 600 such as a Module Case Circuit Breaker (MCCB). The reinforced thermoplastic polymer material or the nanocomposite material is used because it has certain mechanical, electrical and thermical properties. Some characteristics of the reinforced thermoplastic polymer material include: it is a semi-crystalline material, and has excellent chemical resistance. Second, it has a relatively high melt temperature point and has the ability to withstand high temperatures for its final use. Third, it has excellent resistance to abrasion and wear.

Module Case Circuit Breakers (MCCBs) have a rugged construction as they can break larger currents usually from (100-1000 A). Module Case Circuit Breakers (MCCBs) protect low voltage AC and DC electrical systems and equipment. MCCBs has protection facilities of over current and earth fault. They have a variable range of 50% to 100% operating current. They can be wired for remote as well as local operation. They can be manufactured for fault levels of 16 KA to 50 KA and operating current range of 25 A to 630 Amps. They are used for application related with larger power flow requirement. MCCBs have a breaker mechanism based on thermal or thermal-magnetic operation. A MCCB is thermal operated for overload current and has a magnetic operation for instant trip in short circuit condition. Trip current may be adjustable in larger ratings. MCCBs can be mounted in multi-tiers in low-voltage switchboards or switchgear cabinets.

The reinforced thermoplastic polymer material or the nanocomposite material is capable of operating in extreme temperatures from −5° to 40° under different moisture levels and complying with the UL-489 North American Standard for electrical products-Safety specifications both in thermal and mechanical properties. The reinforced thermoplastic polymer material or the nanocomposite material allows the manufacture of the circuit breakers cases through the injection manufacturing process. The reinforced thermoplastic polymer material or the nanocomposite material is a material with a similar or better specification in the physical properties compared to the current thermosets. The reinforced thermoplastic polymer material or the nanocomposite material has thermal, structural and mechanical properties better than the current thermosets as nano-structure of nano crystals or nano clay is used.

The reinforced thermoplastic polymer material or the nanocomposite material is capable of withstanding the pressure and heat generated by an electrical arc in the circuit interruption. The reinforced thermoplastic polymer material or the nanocomposite material can withstand a lot of mechanical pressure and doesn't suffer any alteration due to high thermal conditions of operation.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method of reinforcing a material with another material, the method comprising:
   mixing homogenously a thermoplastic polymer material with a nano particles material in a hot process to reinforce the thermoplastic polymer material with the nano particles material; and
   forming a nanocomposite material by insertion of nano particles of the nano particles material into thermoplastic polymer of the thermoplastic polymer material,
   wherein the nano particles material having a mechanical wear property, a dielectric property and a thermal property of fire retardant.

2. The method of claim 1, wherein the nano particles material having a range one of 1% the nano particles material by weight, or 3% the nano particles material by weight, or 5% the nano particles material by weight.

3. The method of claim 1, wherein mixing homogenously a thermoplastic polymer material with a nano particles material further comprising:
   mixing homogenously polyamide with the nano particles material.

4. The method of claim 3, wherein the polyamide is Nylon 6, 6 or PA 6,6.

5. The method of claim 1, wherein the nano particles material is Muscovite $KAl_2(AlSi_3O_{10})(OH)_2$.

6. The method of claim 1, wherein the nano particles material is Phlogopite $K(Mg, Fe, Mn)_3Si_3AlO_{10}(F,OH)_2$.

7. The method of claim 1, wherein the nano particles material having a range of 1-5% by weight.

8. The method of claim 1, wherein mixing homogenously a thermoplastic polymer material with a nano particles material further comprising:

mixing the thermoplastic polymer material with the nano particles material in the hot process having multiple zones of heat.

9. The method of claim 1, wherein forming a nano composite material further comprising:
moving the nano particles material via a first screw and moving the thermoplastic polymer material via a second screw in a mixing chamber in which heat increases progressively to melt the thermoplastic polymer material and making possible insertion of the nano particles.

10. A circuit breaker comprising:
a body of a nanocomposite material formed by insertion of nano particles of a nano particles material in thermoplastic polymer of a thermoplastic polymer material,
wherein the thermoplastic polymer material is mixed homogenously with the nano particles material in a hot process to reinforce the thermoplastic polymer material with the nano particles material,
wherein the nano particles material having a mechanical wear property, a dielectric property and a thermal property of fire retardant.

11. The circuit breaker of claim 10, wherein the nano particles material having a range one of 1% the nano particles material by weight, or 3% the nano particles material by weight, or 5% the nano particles material by weight.

12. The circuit breaker of claim 10, wherein the thermoplastic polymer material is polyamide.

13. The circuit breaker of claim 12, wherein the polyamide is Nylon 6, 6 or PA 6,6.

14. The circuit breaker of claim 10, wherein the nano particles material is Muscovite $KAl_2(AlSi_3O_{10})(OH)_2$.

15. The circuit breaker of claim 10, wherein the nano particles material is Phlogopite $K(Mg, Fe, Mn)_3Si_3AlO_{10}(F, OH)_2$.

16. The circuit breaker of claim 10, wherein the nano particles material having a range of 1-5% by weight.

17. A method of reinforcing a thermoplastic polymer material with a nano particles material, the method comprising:
mixing homogenously a thermoplastic polymer material with a nano particles material in a hot process having multiple zones of heat to reinforce the thermoplastic polymer material with the nano particles material; and
forming a nanocomposite material by moving the nano particles material via a first screw and moving the thermoplastic polymer material via a second screw in a mixing chamber in which heat increases progressively to melt the thermoplastic polymer material and making possible insertion of the nano particles material,
wherein the nano particles material having a mechanical wear property, a dielectric property and a thermal property of fire retardant, and
wherein the nano particles material having a range of 1-5% by weight.

18. The method of claim 17, wherein the nano particles material is one of Muscovite $KAl_2(AlSi_3O_{10})(OH)_2$ or Phlogopite $K(Mg, Fe, Mn)_3Si_3AlO_{10}(F,OH)_2$.

19. The method of claim 18, wherein the thermoplastic polymer material is polyamide.

20. The method of claim 19, wherein the polyamide is Nylon 6, 6 or PA 6,6.

* * * * *